United States Patent [19]

Schabert et al.

[11] 4,157,939

[45] Jun. 12, 1979

[54] PRESSURIZED-WATER REACTOR EMERGENCY CORE SHUTDOWN

[75] Inventors: Hans-Peter Schabert, Erlangen; Leonhard Irion, Rückersdorf; Hartmut Seidelberger, Erlangen, all of Fed. Rep. of Germany

[73] Assignee: Kraftwerk Union Aktiengesellschaft, Mulheim, Fed. Rep. of Germany

[21] Appl. No.: 567,901

[22] Filed: Apr. 14, 1975

[30] Foreign Application Priority Data

Apr. 16, 1974 [DE] Fed. Rep. of Germany ....... 2418325

[51] Int. Cl.² .............................................. G21C 9/00
[52] U.S. Cl. .......................................... 176/38; 176/87
[58] Field of Search ............................... 176/37, 38, 65

[56] References Cited

U.S. PATENT DOCUMENTS

| | | | |
|---|---|---|---|
| 3,528,884 | 9/1970 | Collier et al. | 176/37 |
| 3,583,479 | 6/1971 | Taylor et al. | 165/134 |
| 3,819,476 | 6/1974 | Pocock et al. | 176/37 |
| 3,865,688 | 2/1975 | Kleimola | 176/37 |
| 3,929,567 | 12/1975 | Schabert et al. | 176/38 |

FOREIGN PATENT DOCUMENTS

| | | | |
|---|---|---|---|
| 1199895 | 9/1963 | Fed. Rep. of Germany | 176/38 |
| 985307 | 4/1961 | United Kingdom | 176/38 |

OTHER PUBLICATIONS

"Power", Steam Generation, Apr. 1970, pp. 90-91.

Primary Examiner—Samuel W. Engle
Assistant Examiner—Ralph Palo
Attorney, Agent, or Firm—Kenyon & Kenyon

[57] ABSTRACT

A pressurized-water reactor installation comprises a pressure vessel containing a core, a main reactor coolant system formed by one or more main coolant loops which are each formed by a steam generator and a main coolant pump and main coolant piping interconnecting the vessel, pump and generator. A pressurizer is connected with the coolant system to maintain a normal operating pressure on water in the loop and which prevents the water from boiling in the loop and pressure vessel. An emergency core cooling system is provided which includes a supply of emergency water and activating means responsive to a drop in the normal operating pressure in the loop, for automatically feeding the emergency water into the vessel to flood the core. In case the pump fails to operate, the pressure in the loop increases due to overheating of the water. However, the loop is provided with a pressure-relief means responsive to such a pressure increase in the loop and which opens the loop to its surrounding atmosphere to a degree dropping the pressure in the loop to below its normal operating pressure, thus causing the emergency core cooling system to be activated.

14 Claims, 6 Drawing Figures

PRESSURIZED-WATER REACTOR EMERGENCY CORE SHUTDOWN

BACKGROUND OF THE INVENTION

A pressurized-water reactor installation commonly comprises a pressure vessel which contains the core, and a main reactor coolant system formed by at least one main coolant loop, conventionally three or four loops, the loop being formed by a steam generator and a main coolant pump and main coolant piping interconnecting the vessel, pump and generator. The loop contains water coolant and is connected with a pressurizer which maintains a normal operating pressure on the water to prevent it from boiling in the loop and pressure vessel, the pressurized water functioning to cool the core and carry the heat to the steam generator's heat exchanger, the water continuously circulating under the force of the main coolant pump.

If the loop opens up, such as might happen by one of its necessary connections rupturing, the water pressure drops, correspondingly dropping the pressure in the pressure vessel, and depriving the core of cooling. The installation includes a protective system which is expected to scram the core in case of such an accident.

In addition, the reactor is provided with an emergency core cooling system formed by a supply of emergency water which is pressurized at a lower pressure than the normal operating pressure of the main coolant loop and which connects with the loop through a check valve held closed by the normal pressure differential and which automatically opens when the pressure of the emergency water supply exceeds the normal operating pressure of the loop, this occuring in the event of the described type of accident to the loop and resulting in the emergency water being injected into the loop and, therefore, into the pressure vessel to flood the core. The supply of emergency water normally includes a supply of borated water which is injected first to shut down the core promptly, together with a supply of water which follows, the emergency water escaping from the ruptured coolant loop, falling into the sump of the reactor building conventionally enclosing the installation, and being pumped from the sump back into the loop, normally through a heat exchanger. In this way, in case of a loss-of-coolant accident, a pressure vessel is promptly supplied with an initial flooding of borated water, followed by a circulation of emergency water.

Such a loss-of-coolant accident is considered to be only hypothetically possible. In the same sense, it can be contended that the main coolant pump might fail, this pump necessarily comprising a casing containing an impeller connected by a shaft to an electric motor. Mechanical failure can be argued as being conceivable, and, of course, an electric power failure would result in putting the pump out of operation.

If the main coolant pump ceases to function for any reason, the coolant circulation through the main coolant loop reduces to a substantial extent and possibly might stop altogether. In such an event, the core would normally be scrammed by activation of the reactor protective system, but the emergency core cooling system, depending on the presssure differential at the check valve, would not go into operation because the coolant pressure in the main coolant loop would not be reduced. As a hypothetically possible accident, the protective system might fail with the result that the core continues to operate at its full rated power, but deprived of the coolant circulation relied on to carry the heat from the core through the steam generator for heat removal and back through the pressure vessel to the core. In such an event, the coolant pressure would rapidly rise to a degree which might result in rupturing the main coolant pipes. Although the emergency core cooling system would then go into action, the pipe would remain ruptured and require repair. If, in addition, almost inconceivably the emergency core cooling system failed to operate, a core melt-down might be the result.

The pressurizer for the main coolant loop is formed by a tank containing water pressurized by steam above the water in the tank, a water spray in the tank serving to condense the steam and drop the pressurizer pressure and heating the water serving to increase the pressure, all as required to maintain the pressure in the main coolant loop at its normal operating pressure. The pressurizer is provided with a pressure-relief valve for its steam space, but when operated, this valve provides for a flow passage of very small cross-sectional area, and can provide only a very small relief for the pressure in the main coolant loop should it increase due to a failure of the main coolant pump. Typically, the flow rate of this pressure relief valve corresponds to only a few percent of the nominal power rating of the reactor core. The emergency core cooling system is combined with a core decay heat removal system which circulates water coolant through the pressure vessel when the core is shutdown as for refueling, and the pressurizer pressure-relief valve is provided only for use at such times.

SUMMARY OF THE INVENTION

The object of the present invention is to protect the main coolant loop or loops of a pressurized-water reactor in the extremely unlikely event of a failure on the part of the main coolant pump or pumps.

According to the present invention, each main coolant loop is provided with pressure-relief means responsive to the previously described increase in the normal pressure in the loop, for opening the loop to its surrounding atmosphere to a degree dropping the pressure in the loop at least far enough below its normal pressure to result in activation of the pressure responsive emergency core cooling system. In other words, if the main coolant pump fails, and the normal operating pressure of the main coolant loop rises to approach a dangerous value to the coolant loop design, the pressure-relief means opens up and drops the pressure in the loop to below the pressure on, in particular, the borated water, the borated water then promptly being injected into the pressure vessel with the borated water shutting down the core in the vessel. In addition, the reduction in the loop pressure, of course, protects the loop against any possibility of rupturing.

In addition to the above, the pressure-relief means is for dropping the pressure in the main coolant loop to a degree adequate to permit boiling of the water trapped in the pressure vessel and flooding the core, a condition resulting from the failure of the main coolant pump. The water coolant is light water and functions as the core moderator, but the steam bubbles resulting from the boiling just described has a poor moderator effect and a rapid and substantial reduction in the reactor core power output, quickly results. When this is followed by activation of the emergency core cooling system, a borated water then injected completes the shutdown, independently of otherwise scramming of the core, the following circulation of emergency water effected by the system then continuously removing heat from the core.

The pressure-relief means described should be an opening in the main coolant loop, released by abnormal high loop coolant pressure, and which has a cross-sectional flow area which is at least one-twentieth of the cross-sectional water-flow area of the main coolant pipes, which area is that required for the normal coolant flow at its normal operating pressure, to effect normal cooling of the reactor core. The pressure-relief means should release or open when the main coolant loop pressure increases from five to twenty bar above its normal pressure previously indicated. Furthermore, the pressure relief means should be designed to stay open once it is opened by the increased pressure, assuring prompt and continuous operation of the emergency core cooling system which depends on the low pressure in the main coolant loop, such as would occur if the loop suffered a substantial rupture and, therefore, loss of coolant.

To obtain the maximum boiling effect in the reactor pressure vessel, as previously described, the pressure-relief means is preferably positioned in the loop at least adjacent to the steam generator, thus assuring substantial lengths of the main coolant loop piping between this means and the reactor pressure vessel. Normally, a pressurized-water reactor steam generator has a primary header for passing the pressurized-water coolant through the heat exchanger of the generator, and for inspection and repair purposes this primary header is provided with one or more manholes each closed by a pressure-resistant cover which is removed to give workmen access to the inside of the primary header. The present invention takes advantage of this fact by removing the usual manhole cover and replacing it with a cover having a coolant pressure-relief hole formed through it and providing the cross-sectional area flow discharge area size previously referred to. This hole is closed by a plunger which functions as a valve, the plunger being fastened to the primary header by rupturable or destructible connections which let go or destruct when the header receives the abnormal coolant pressure resulting from a main coolant pump failure. Such connecting means must be strong enough to safety hold the plunger closed during all normal reactor operations, and the connecting means, such as tension bolts, should be designed with a sufficient safety factor to make certain that they will now inadvertently destruct or rupture during normal reactor operations. This, in turn, suggests that the normal coolant pressure would have to become possibly unsafely high before the fastening means would let go.

The displacement pressure on the front end of the plunger exposed to the coolant in the generator's primary header, is dictated by the required size of the pressure-relief opening and which has been previously described. To make certain that the connecting means will rupture or destruct reliably, although designed with the previously mentioned safety factor, the back end of the plunger is provided with a piston having a front forming a piston area very substantially larger than that of the front end of the plunger, and a passage extends from the front end of the plunger to the front of this piston, the front being provided with a suitable enclosure. This passage is controlled by a valve having a front contacted by the coolant via the passage and presenting a piston area to the coolant which is smaller than either of the other two referred-to piston areas and which is biased against opening and otherwise designed to open when the coolant pressure increases from 5 to 20 bar above the normal main coolant loop operating pressure, the coolant then substantially immediately having access to the large piston area of the piston which, being connected to the plunger, transmits the resulting very large force to pull back the plunger, thus highly stressing and quickly rupturing or destroying the fastening means normally holding the plunger closing the relief opening. The entire pressure-relief means then blows off of the cover over the generator's primary header, quickly releasing the coolant and producing both the pressure drop in the main coolant loop and the consequent boiling of the water retained in the reactor pressure vessel.

When the above occurs, the pressurized coolant is released and flashes to vapor phase. However, all pressurized-water reactor installations are housed in a reactor building with the pressure-carrying components surrounded by concrete walls with the concrete parts all totally enclosed by a spherical steel containment shell designed to resist the maximum internal pressure that could result from total release of the pressurized water coolant into the space within the containment shell. Without the present invention, this coolant release would also occur because the main coolant loop pipe or possibly including the heat exchanger in the steam generator, would rupture, but with the present invention this kind of hypothetically possible accident would not result in destruction of the main coolant loop piping and possibly its component equipment.

BRIEF DESCRIPTION OF THE DRAWINGS

Specific examples of this invention are schematically illustrated by the accompanying drawings, in which.

DETAILED DESCRIPTION OF THE INVENTION

Figure 1:
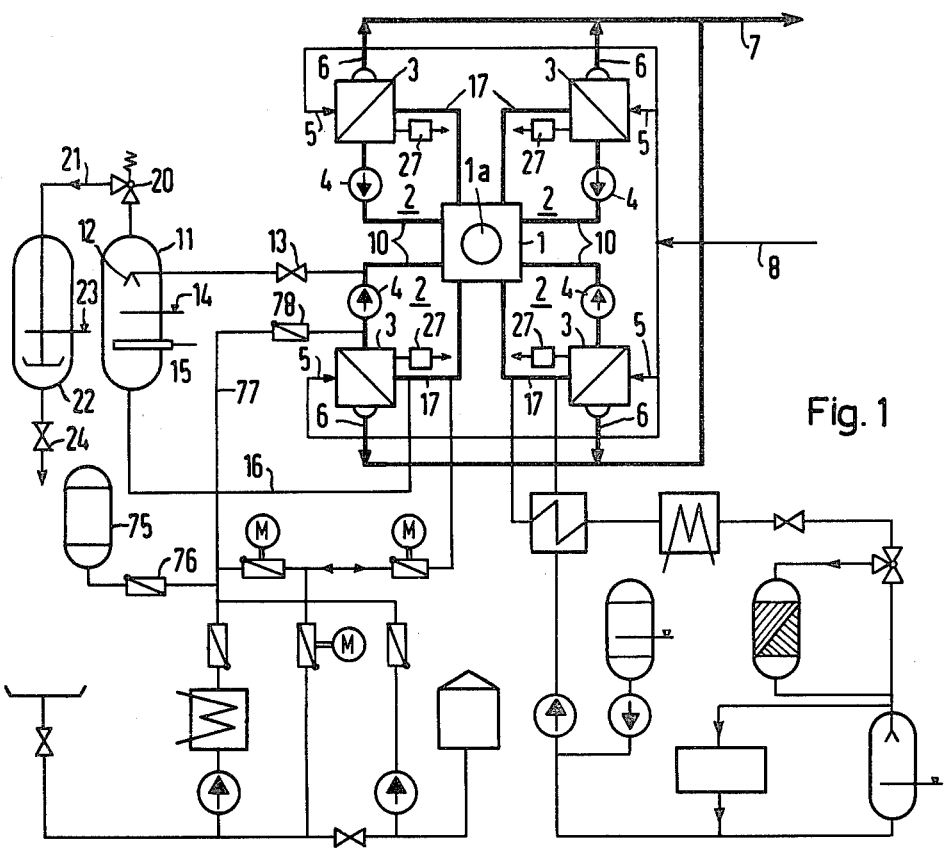
FIG. 1 is a diagram showing a typical pressurized-water reactor installation including its emergency core cooling system.

In FIG. 1 of the above drawings, a pressurized-water power reactor installation, for example, having a capacity of 1,000 MWe is diagrammatically shown. The reactor pressure vessel 1 contains the reactor core 1a connected in circuit with four main coolant loops 2, each comprising a steam generator 3 and a main coolant pump 4, together with the necessary piping subsequently referred to. The secondary side of each steam generator 3 has a feed-water inlet 4 and a steam output outlet 6 connecting with the steam line 7, ordinarily supplying one or more steam turbines which power electric generators, not shown. The steam condensate from the turbine through a pipe 8, returns the condensate, possibly after pressure boosting, to the feed-water supply inlet 5.

As to each coolant loop 2, a cold pipe leg 10 returns the reactor coolant to the pressure vessel 1. The previously described pressurizer 11 has the pressure-reducing water spray 12, controlled by a valve 13, and containing water up to the level indicated at 14, and above which there is a space containing the pressurizing steam under the control of the water supply 12 and the heater 15 immersed in the water, the water of this pressurizer being connected by a pipe line 16 with one of the coolant loops 2, thus keeping all of the coolant loops at the desired or normal operating pressure. The pressure relief or safety valve of the pressurizer is indicated at 20, its blow-off pipe line 21 going to the discharge tank 22 where it is dispersed in water maintained at about the level indicated at 23, the blow-off steam or vapor thus being condensed and the water level 23 being maintained by drawing off the water through a valve 24 as required.

For emphasis, it is now repeated that this blow-off or pressure-relief valve 20 is very small. It is mainly to prevent an undue pressure within the pressurizer which has become beyond the control of the cold water supply 12. The blow-off cross-sectional area through this valve 20 when open only one percent, and sometimes even less, of the cross-sectional flow area of the cold legs 10 and the hot legs 17 of the main coolant loops, the hot legs 17 carrying the hotter coolant directly from the pressure vessel to the primary headers of the steam generators, referred to in more detail hereinafter. The pressure-relief means of the present invention is indicated at 27 as being applied to the primary header of each of the steam generators.

FIG. 1 also shows an example of an emergency core cooling system as well as the usual auxiliary system used to supply properly treated coolant for the reactor. To understand the present invention, it is sufficient to note that the emergency core-cooling system is shown as including the supply of pressurized emergency water shown at 75 and connecting with one of the main coolant loops 2 via the check valves 76 and 78. If the main loop opens up so that its pressure drops below the pressure of the pressurized water at 75, the emergency water can then flow via the pipe 77 through the normally closed check valves 76 and 78 and into the loop. This can occur only if the pressure in the loop drops below the pressure of the pressurized-water supply 75.

Figure 2:
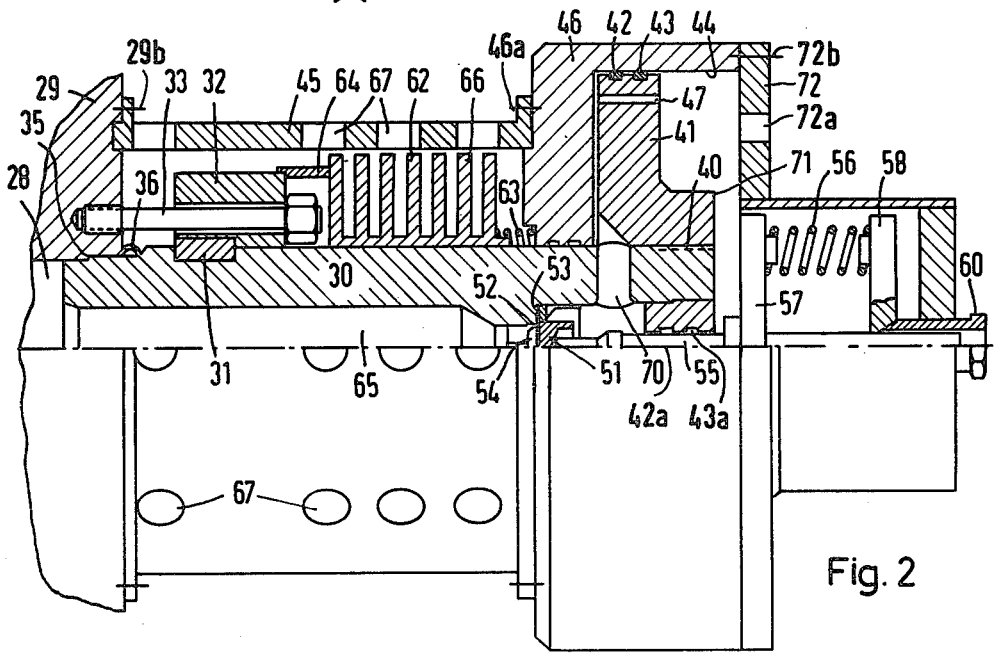
FIG. 2 shows the contruction of an example of the pressure-relief means previously described briefly, the upper half showing the parts in longitudinal, vertical section and the bottom half showing the parts in elevation.

Going now to FIG. 2, the pressure-relief opening 28 is formed in the cover 29 which is fastened to the steam generator's primary header which may be in the manner that the usual manhole cover is fastened to the primary header. In the following described modification shown by FIG. 3, the primary header 3 is shown with its manhole 25 and with the cover 29 fixed to the primary header by suitable screw fastenings generally indicated at 29a.

The opening 28 in the metal cover 29 would typically have a diameter of 200 mm, making its cross-sectional area approximately 10 percent of the cross-sectional area of the main coolant loop legs 10 and 17 which typically have a diameter of 700 mm in the case of a reactor installation of the power previously indicated.

The hole 28 is normally closed by the front end of a plunger 30. Adjacent to its front end, the plunger 30 has an annular groove in which is fitted an adequately strong split ring 31 which anchors a strong annular flange 32 having holes through which bolts 33 are passed, the bolts having front ends screwed into threaded holes formed in the cover 29 and heads which engage the back side of the annular flange 32. Although not specifically illustrated, there is an annular series of these bolts 33 extending completely around the plunger 30 and it is these bolts 33 which serve to fasten the plunger 30 to the cover 39 which is, in turn, fastened to the steam generator's header 3.

It is these bolts 33 which function as the destructible or rupturable fastening means and which must let go when the front end of the plunger 30 receives the abnormal coolant pressure. The bolts 33 must provide a satisfactory safety factor in resisting the force applied to the piston area presented by the front end of the plunger 30 to the pressurized-water coolant in the steam generator's primary header, under all normal operating conditions. As indicated, a lip seal 36, made of sheet metal and welded in place, can be used in the interest of absolute pressure tightness between the plunger and the inside of the hole 28. This lip seal may be welded to both the cover 29 and the plunger 30, and being made of sheet metal of appropriate thinness, this seal will rupture when the bolts 33 let go.

The back end of the plunger 30 has screw threads 40 on which the piston 41 is screwed and which has a front forming a piston area very substantially larger than that provided by the front end of the plunger 30, plus any piston area afforded by the internal construction of this plunger presently described.

The piston 41 has peripheral piston rings 42 and 43 which ride inside of a cylinder 44 which has a front end closed by a radial wall 46 so that the front face of the piston 41 is fully enclosed. The cylinder and its front wall or front cylinder head 46 are mounted by a tubular mounting 45 fixed to the wall or head 46 by screw fastenings 46a and to the metal cover 29 by screw fastenings 29b. However, these screw fastenings 29b and 46a are only for the purpose of mounting the tubular mounting 46 and the cylindrical parts 44 and 46 to the cover 29, and they cannot withstand forces anything like those for which the bolts 33 are designed to carry. If the bolts 33 rupture, one or another of the screw fastenings 29b and 46a will also rupture, they being much weaker than the bolts 33.

The plunger 30 is tubular so its forms an axial passage 65 extending from the plunger's front end back to the front end of an annular valve 51 which seats on an internal shoulder 52, the passage 65 reducing in size to form a relatively small annular space to which the front face of the valve 51 presents a piston area very much smaller than that of the front end of the plunger 30 and its internal construction which is, in turn, substantially smaller than the piston area presented by the front of the piston 41.

This valve 51 which seats on the seat 52 provided by the back end of the plunger's internal annular shoulder can in the interest of safety be hermetically sealed by metal foil 53, such as gold foil, which is ruptured by a portion 54 of the valve 51 which engages the front face of the foil, whenever the valve 51 is forced backwardly by the coolant pressure against it. This valve is normally closed by being biased forwardly by the force of a push rod 55 extending through the piston 41 which is annular, and sealed relative to the rod by piston rings 42a–43a, the push rod 55 behind the piston having an annular mounting receiving the force of an annular series of compression springs 56 positioned by an annular plate 58 which is adjustable by an external accessible nut 60 so that the forward bias on the valve 51 can be adjusted as desired. Behind the valve 51, which is housed within the tubular plunger 30 at its back end, one or more radial passages 70 formed through the plunger open the plunger's passage 65 to the front face of the piston 41 when the valve 51 is pressed backwardly by the coolant pressure with, of course, the foil sealing 53 rupturing.

Because metal foil, particularly gold foil, is susceptible to overheating, the plunger 30 is externally surrounded by cooling fin unit 62 which surrounds the plunger 30 and is pressed forwardly by a spring 63 between the unit 62 and the wall or cylinder head 46, the front end of the unit pressing against an annular spacer 64 which engages the annular plunger-anchoring flange 32. This units has a multiplicity of radial fins 66, the tubular mounting 45 having a large number of perforations 67 through which air can thermodynamically circulate upwardly around the fins 66 to carry away the heat from the plunger, thus protecting the foil 53 under normal operating conditions. A small bleeder hole 47 is formed through the piston 41 to bleed off any vapor that might escape through the valve 51, in spite of the foil seal 53, to prevent a pressure build-up in front of the piston 41 inadvertently. This hole can have a diameter less than one-fiftieth of the diameter of the piston 41, thus making the hole 47 ineffective in the event of a large pressure increase in front of the piston 41.

In operation, a main coolant pump failure which, in the absence of a core scram, produces the large increase in the coolant pressure inside of the coolant loop involved, is reflected into the generator's primary header, the coolant in the passage 65 of the plunger 30 transmitting this pressure to the front piston area of the valve 51 which then moves backwardly against the bias of its normal positioning springs 56, the foil 53 rupturing, and the coolant then flowing through the valve and the passage or passages 70 formed through the annular plunger and gaining access to the front of the piston 41 which because of its very large piston area, tensions the plunger 30 far beyond the ability of the bolts 33 to withstand, these rupturing and the entire pressure valve assembly blowing off of the cover 29 so that the opening 28 can act as previously described. The opening 28 cannot be reclosed. During the action described, the tubular mounting 45 carries the reaction to the coolant pressure in front of the piston 41, in compression. However, the piston is provided with a back abutment 71 which can strike the back wall 72, suitably vented as at 72a, which provides an enclosure of the back of the piston 41. This back wall 72 can be fastened by screw fastenings 72b to the back end of the cylinder 44. If these fastenings are strong enough, the fastenings 46a and 29b will rupture so that the entire construction is blown away. On the other hand, if these fastenings 72b are made weaker than the fastenings 29b and 46a, only the back plate 72 will be driven off with the piston 41 going along with it, possibly rupturing the fastenings 46a, and leaving the tubular mounting 45 in place so that the escaping coolant diffuses radially through the holes 67.

Figure 3:
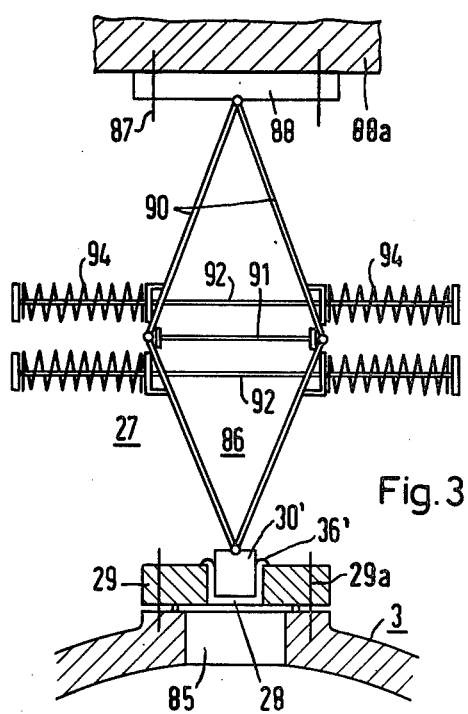
FIG. 3 illustrates a modification of the pressure-relief means and includes a portion of the primary header of the steam generator including one of the manholes.

In the modification of FIG. 3, a portion of the primary header 3 is shown with the cover 29 secured to the manhole opening 85 by the screw fastenings 29, with the hole 28 formed through the cover. In this case the shutoff body 30' is held against displacement by the coolant when under its normal operating pressure, by a toggle joint 86, formed by pivotal levers 90, having one end fixed to the shutoff body and its other end fixed to a yoke 88 fixed by screws 87 to a rigid support 88a. The joint is held partially unfolded by a central strut 91, and it is normally held in that position by tension rods 92 mounting springs 94. In the event of an abnormally high coolant pressure, these springs 94 permit the toggle joint to unfold further and release the shutoff body 30' which is normally sealed by a lip seal 36' having the characteristics of the lip seal 36 previously described.

Figure 4:
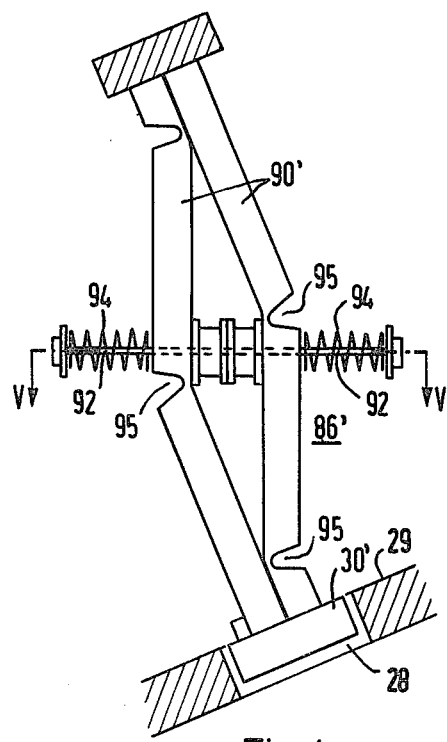
FIG. 4 is like FIG. 3 but shows a further modification.
Figure 6:
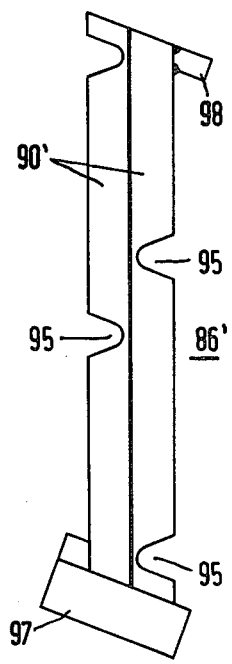
FIG. 6 shows parts used which, when erected, provide the construction shown by FIG. 4.
Figure 5:
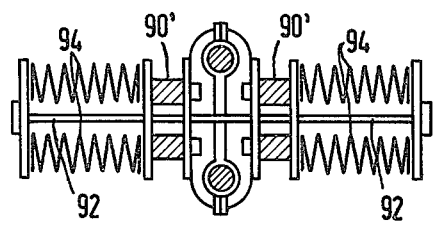
FIG. 5 is a cross section taken on the line V—V in FIG. 4.

In FIG. 4 the shutoff body 30' is normally held closed by an assymetrical toggle joint 86', the levers 90', in this instance, not having the pivot joints of the previously described form but, instead, being provided with notches 95 in such a manner that the abnormal coolant pressure, overcoming the force of the springs 94, bends the levers 90' around the cutouts 95 which thus function as pivotal members. FIG. 6 shows that this form can be economically manufactured from straight members which are unbent, the members 95' being subsequently partially bent as required to form the construction of FIG. 4. The end pieces 97 and 98 are applied and the FIG. 6 construction can be swung into position and the two levers forced apart as required.

It is to be noted that in the FIG. 3 construction the shutoff body 30' can reclose when the coolant pressure drops. This may be desirable to prevent the escape of the emergency core cooling water, injected upon actuation of the emergency core cooling system so it cannot escape through the large opening 28.

What is claimed is:

1. A pressurized-water reactor installation comprising a pressure vessel containing a core, a main coolant system comprising at least one main coolant loop formed by a steam generator and a main coolant pump and main coolant piping interconnecting the vessel, pump and generator, said loop containing water coolant and having means for maintaining a normal operating pressure on the water to prevent it from boiling in the loop and pressure vessel, an emergency core cooling system comprising a supply of emergency water and activating means responsive to a drop in said normal pressure in said loop for automatically feeding the emergency water into said vessel to flood the core, a normally closed valve in said loop for opening the loop to its surrounding atmosphere to a degree dropping the pressure in the loop to below said normal pressure, and means for causing said valve to open automatically in response to an increase in pressure on said water above said normal pressure.

2. The installation of claim 1 in which said dropping of the pressure in said loop is adequate to permit boiling of the water in said pressure vessel.

3. The installation of claim 1 in which said piping is formed by pipes having a cross-sectional water-flow area required for normally cooling said core when carrying water pressurized at said normal operating pressure, and said valve when open forms an opening in said loop having a cross-sectional flow area which is at least one-twentieth said area of said pipes.

4. The installation of claim 1 in which said third-named means is responsive to any one pressure within the range of from 5 to 20 bar above said normal pressure in the loop.

5. The installation of claim 1 in which said valve is positioned in said loop at least adjacent to said steam generator.

6. The installation of claim 1 in which said valve is constructed so as to remain continuously open after being opened by said third-named means.

7. The installation of claim 1 in which said steam generator has a primary header though which said piping is connected so that the header contains said water coolant, said header having at least one manhole, said pressure-relief means comprising a closure for said manhole and destructible holding means for holding the closure normally closed and which destructs and releases the closure, when stressed by the closure receiving the force of the water coolant when its pressure increases above said normal pressure.

8. A pressurized-water reactor installation comprising a pressure vessel containing a core, a main reactor coolant system comprising at least one main coolant loop formed by a steam generator and a main coolant pump and main coolant piping interconnecting the vessel, pump and generator, said loop containing water coolant and having means for maintaining a normal operating pressure on the water to prevent it from boiling in the loop and pressure vessel, an emergency core cooling system comprising a supply of emergency water and activating means responsive to a drop in said normal pressure in said loop for automatically feeding the emergency water into said vessel to flood the core, and pressure-relief means responsive to an increase in said normal pressure in said loop for opening the loop to its surrounding atmosphere to a degree dropping the pressure in the loop to below said normal pressure, a part of said loop and containing said water coolant being formed with a coolant pressure-relief hole, said part having an outside and a plunger on the part's outside and having a front end normally closing said hole and exposing a first piston area to said water coolant, said plunger having a back end, destructible means comprising rupturable members interconnecting said plunger and part, a piston with a front forming a second piston area substantially greater than said first piston area and which piston is connected to the plunger's said back end, means for forming an enclosure for the piston's said front, said plunger having a water coolant passage extending from the plunger's said front end backwardly and opening into said enclosure, valve means for controlling flow of the water coolant through said passage and biasing means for holding this valve means normally closed, said valve means having a surface forming a third piston area substantially smaller than said first and second piston areas and which third piston area is exposed to water coolant in said passage, said biasing means permitting said valve means to open under the force of the water coolant when its pressure increases above said normal pressure, so that the water coolant then enters said enclosure and applies force to said second piston area with consequent rupture destruction of said rupturable members, those rupturable members normally holding intact under the force of the water coolant on said first piston area.

9. The installation of claim 8 in which said enclosure is provided with a bleeder passage for bleeding off water coolant from the enclosure in small amounts which might inadvertently result from leakage through said valve means.

10. The installation of claim 9 in which the chance for said leakage to occur is reduced by rupturable metal foil hermetically sealing said valve means against leakage.

11. The installation of claim 10 in which said plunger has cooling fins exposed to air flow, for reducing heat conducted from the water coolant through the plunger to said metal foil.

12. The installation of claim 11 in which a tubular mounting has ends abutting said enclosure and said cover for the said manhole, this tubular mounting being perforated with air holes and surrounding said plunger and rupturable members and the plungers said cooling fins, said tubular mounting being initially stressed by compression at the time said second piston area initially receives the force of the water coolant when said valve means opens, said enclosure forming an abutment for said piston against which the piston is moved backwardly at that time so that said tubular mounting then receives tension stress, said tubular mounting having fastenings connecting it to either or both said cover and enclosure and which fastenings are easily rupturable by said tension stress.

13. A pressurized-water reactor installation comprising a pressure vessel containing a core, a main reactor coolant system comprising at least one main coolant loop formed by a steam generator and a main coolant pump and main coolant piping interconnecting the vessel, pump and generator, said loop containing water coolant and having means for maintaining a normal operating pressure on the water to prevent it from boiling in the loop and pressure vessel, an emergency core cooling system comprising a supply of emergency water and activating means responsive to a drop in said normal pressure in said loop for automatically feeding the emergency water into said vessel to flood the core, and pressure-relief means responsive to an increase in said normal pressure in said loop for opening the loop to its surrounding atmosphere to a degree dropping the pressure in the loop to below said normal pressure, said steam generator having a primary header through which said piping is connected so that the header contains said water coolant, said header having at least one manhole, said pressure-relief means comprising a closure for said manhole and destructible holding means for holding the closure normally closed and which destructs and releases the closure, when stressed by the closure receiving the force of the water coolant when its pressure increases above said normal pressure, said destructible holding means comprising a toggle joint having one end fixed to said closure and an opposite end fixed to an anchor point, and rupturable means for holding said toggle joint from folding.

14. A pressurized-water reactor installation comprising a pressure vessel containing a core, a main reactor coolant system comprising at least one main coolant loop formed by a steam generator and a main coolant pump and main coolant piping interconnecting the vessel, pump and generator, said loop containing water coolant and having means for maintaining a normal operating pressure on the water to prevent it from boiling in the loop and pressure vessel, an emergency core cooling system comprising a supply of emergency water and activating means responsive to a drop in said normal pressure in said loop for automatically feeding the emergency water into said vessel to flood the core, and pressure-relief means responsive to an increase in said normal pressure in said loop for opening the loop to its surrounding atmosphere to a degree dropping the pressure in the loop to below said normal pressure, said steam generator having a primary header through which said piping is connected so that the header contains said water coolant, said header having at least one manhole, said pressure-relief means comprising a closure for said manhole and destructible holding means for holding the closure normally closed and which destructs and releases the closure, when stressed by the closure receiving the force of the water coolant when its pressure increases above said normal pressure, said destructible holding means comprising a toggle joint having one end fixed to said closure and an opposite end fixed to an anchor joint, said joint having bars with malleable metal bendable portions which destruct by bending to permit folding of the toggle joint.

* * * * *